Figure 1:
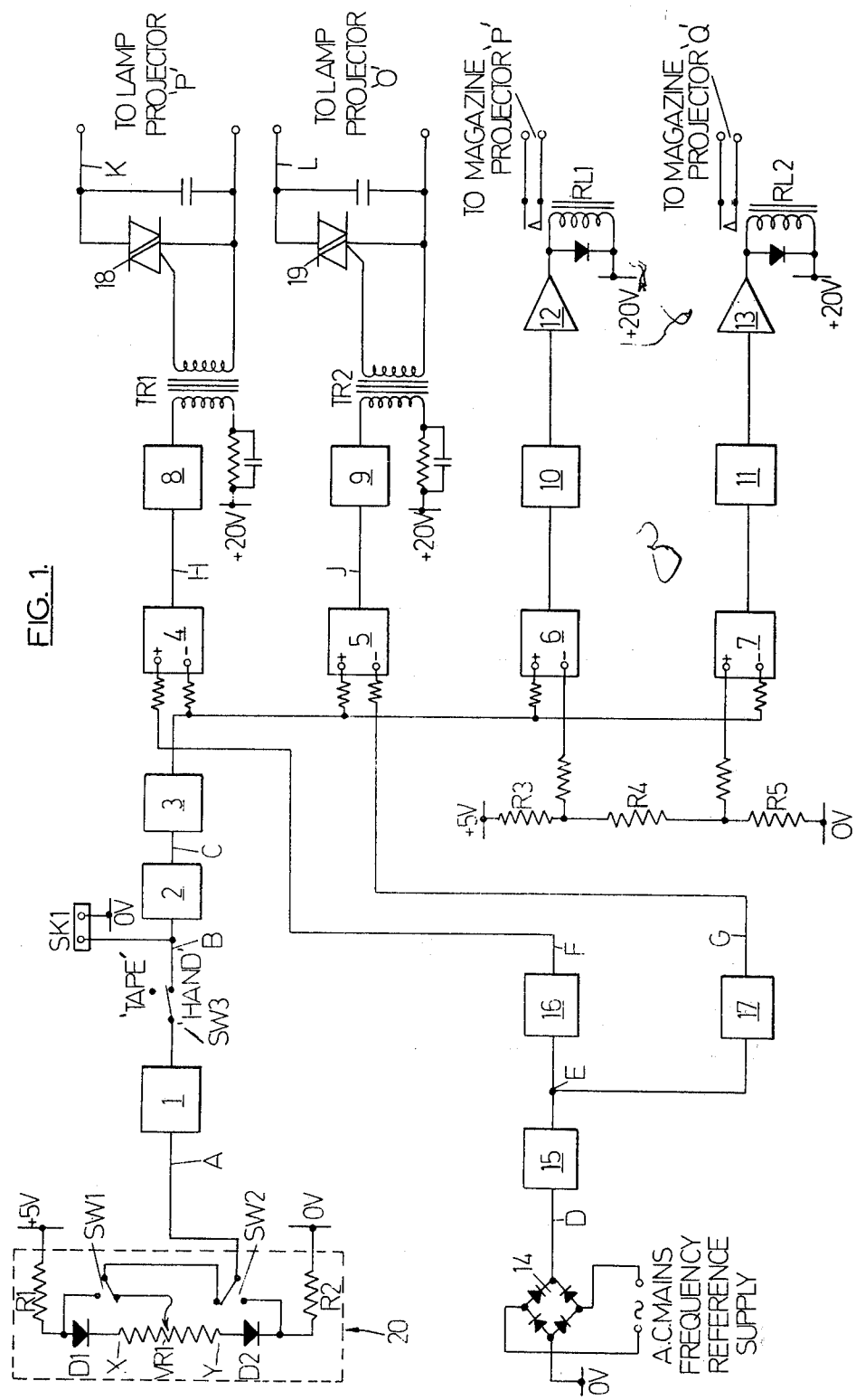

United States Patent [19]

Bowry et al.

[11] 3,958,875
[45] May 25, 1976

[54] APPARATUS FOR CONTROLLING SLIDE PROJECTORS

[75] Inventors: Anthony David Bowry, Clifton; Christopher Francis, London, both of England

[73] Assignee: Animatic Company Limited, London, England

[22] Filed: May 31, 1974

[21] Appl. No.: 475,293

[30] Foreign Application Priority Data
May 31, 1973 United Kingdom............ 25960/73

[52] U.S. Cl. .............................................. 353/86
[51] Int. Cl.[2] .................. G03B 21/20; G03B 23/16
[58] Field of Search ................ 353/86, 90, 93, 83

[56] References Cited
UNITED STATES PATENTS

| | | | |
|---|---|---|---|
| 3,282,155 | 11/1966 | Cleary | 353/94 |
| 3,622,236 | 11/1971 | Novy | 353/94 |
| 3,841,744 | 10/1974 | Rubin | 353/85 |
| 3,844,646 | 10/1974 | Oury | 353/94 |

*Primary Examiner*—Richard E. Aegerter
*Assistant Examiner*—A. J. Mirabito
*Attorney, Agent, or Firm*—Imirie, Smiley & Linn

[57] ABSTRACT

The invention uses frequency control of lamps and magazines in projectors and is especially adapted for programmed control by recording the frequency signals produced by previous rehearsal of the programme under manual control. The circuit uses an integrated voltage from the frequency signal to control threshold devices operating triggered switches controlling supply to the lamps, and to actuate a magazine control; a saw tooth signal being used as the basic timing signal in operating the lamps.

37 Claims, 12 Drawing Figures

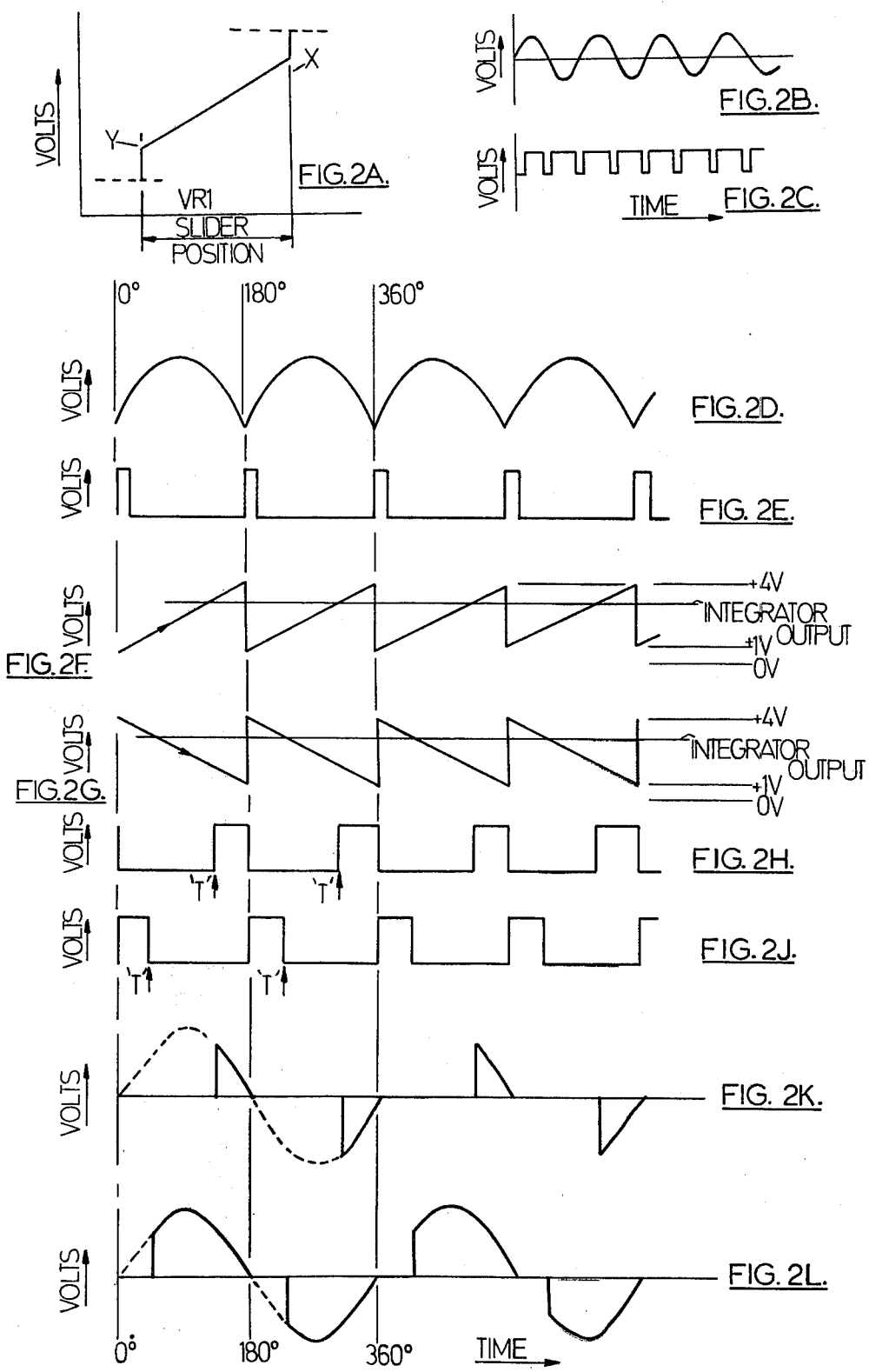

APPARATUS FOR CONTROLLING SLIDE PROJECTORS

This invention relates to a circuit for controlling lamp illumination of one or more slide projectors particularly of the type having electrically operated slide magazines.

It is an object of the present invention to provide an efficacious electronic circuit for controlling such a slide projector.

There is provided by the present invention a projector control circuit for controlling the illumination of the lamp of the projector, comprising a triggered switch for controlling the supply of an alternating current to the lamp so that the amount of current supplied to the lamp can be varied from zero to the maximum the lamp can draw, by varying the angle in respect of the a.c. supply at which the triggered switch is fired, a generator for generating triggering signals for triggering the triggered switch at instants subject to the level of a threshold voltage applied to the generator, a ramp generator for producing ramp signals to operate the trigger signal generator, and a frequency signal decoder for producing a frequency dependent, integrated voltage to serve as a threshold voltage for the triggersignal generator so that, with the triggered switch connected to the projector lamp, by continuously varying the frequency input to the decoder and thereby the threshold voltage applied to the trigger signal generator, the illuminatation of the lamp can be varied between zero and maximum brightness.

The circuit may be used with more than one projector for instance, to operatae twin projectors alternately. Accordingly, in an embodiment of the invention, the circuit is duplicated insofar as to provide a trigger signal generator, a ramp signal generator and a triggered switch for each projector, with the ramp signal generators arranged to provide signals of opposite polarity so that, with the triggered switches connected respectively to the lamps of the projectors, as said frequency is caried first in one direction, the lamp of one projector is dimmed and then extinguished and the lamp of the other projector is illuminated and then brought up to full illumination and, as said frequency is then varied in the opposite direction to reverse the variation in the first direction, the lamp of the one projector is illuminated and then brought up to full illumination and the lamp of the other projector is dimmed and then extinguished.

Where the projector has an electrically operated magazine, the circuit may be used also to control the operation of the magazine. For this purpose the decoder may be adapted to respond to a change in said frequency greater than is needed to extinguish a projector lamp to produce, following such change, a limit voltage; and actuating means may be provided by which, in response to the limit voltage, the magazine of the projector the lamp of which has been extinguished by said frequency change, can be actuated to cause a fresh slide to be moved to the viewing position. The magazine control may be applied to twin projectors, in which case, a magazine actuating means is provided for each projector, and the decoder is adapted to respond to a change in said frequency in said one direction greater than is needed fully to extinguish the lamp of said one projector and fully to illuminate the lamp of said other projector, to produce a first limit voltage, and to respond to the reverse change in said frequency greater than is needed fully to illuminate the lamp of said one projector and fully to extinguish the lamp of said other projector, to produce a second limit voltage, and the two magazine actuating means are arranged so that the one provided in respect of said one projector responds only to the first limit voltage and so that the one provided in respect of said other projector responds only to the second limit voltage.

The invention permits control to be effected from a programme of signals recorded, by use of a suitable encoder, for instance, on a record tape, by playing back the record and applying the signals therefrom to the circuit. Control may also be effected, however, from hand operated controls and particularly from remote control handsets. In either case, the frequency signal can be arranged to operate the lamp of the projector or each projector alone or together with the magazine or magazines thereof; and, in the case of twin projectors, it can be arranged to operate either one of the projectors alone or to illuminate the lamps of both projectors simultaneously i.e. by a frequency mid-way between the limits producing the limit voltages.

Instead of one projector, a set arranged in parallel could be used; and likewise in place of twin projectors, twin sets each arranged in parallel could be used.

The circuit may be arranged to provide for automatic operation of the lamp or lamps, at a rate determined by the setting of a control on actuation thereof; and several such controls may be used to provide a choice of ranges of further rate at which a lamp is dimmed or illuminated. The actuation may be manual or by recorded signal. A Further control may be provided in the case of a projector having an electrically operated magazine so that the magazine is automatically returned to a start position on actuation of the control either by manual actuation or recorded signal; and a still further control may similarly be provided to permit the projector magazine to be reversed in direction or to be isolated from the circuit so that the circuit operates the lamp or lamps only. The manual actuating means employed with the above-mentioned controls may be in the form of manually operated switches. An alternative actuating means or set thereof may be provided on a handset to permit remote operation of the control or controls. A manually operated encoder may be used with the circuit to provide the frequency input to the decoder, and such encoder may have a handset control and may provide an output from which the signals produced by the encoder can be recorded as the or each projector is being operated and the recorded signals subsequently used to operate the decoder automatically by playback of the record.

In a preferred form of the invention, an encoding means is used comprising: a control box provided with a potentiometer connected to a voltage source and the slider of which is used to take a D.C. voltage according to its position; the control box being provided with a (1) switch which is operated when the potentiometer slider reaches one of its extreme positions to provide a voltage corresponding to a limit voltage; and (2) a variable frequency oscillator, the output frequency of which is governed by and is proportional to the D.C. voltage produced by the control box to which it is connected, and which output may be magnetically recorded or fed direct to the decoding means. A further switch operated by the potentiometer slider as it reaches the other extreme position may be used, when two limit voltages are required, to provide the second of the limit voltages.

The decoding means in the preferred form of the invention comprise: a waveform-squaring device, such as a Schmitt trigger, for example, which receives the variable frequency oscillator output either directly or as reproduced by a magnetic recording, and converts it into a rectangular waveform of constant amplitude the repetition rate of which varies as the oscillator frequency varies; an integrator which receives the now rectangular waveform and produces a D.C. signal having the limit voltage or intermediate voltage levels, according to the original settings of the control box.

In the preferred form of the invention the energy control means comprise; at least one semiconductor switch having a trigger electrode such as, for example, a silicon controlled rectifier (SCR) or what is known as a "Triac" this device being similar to the SCRs connected back to back to provide conduction in both senses of direction but controlled by a single trigger electrode, a ramp generator, such as a Miller sawtooth generator for example, synchronized by a full-wave rectified A.C. signal to run at twice mains frequency; a threshold level detector and trigger signal generator which compares the D.C. signal from the integrator with the ramp function and generates a pulse each time the ramp voltage exceeds a value determined by the D.C. signal, the arrangement being such that the pulse is fed to the trigger electrode of the semiconductor switch is itself connected in series with a projector lamp and an A.C. power supply so that, at a point in each half cycle of the supply determined by the time taken for ramp function to produce a trigger pulse, the switch is triggered into a conducting state. Thus, when the D.C. signal is at a first level the trigger pulse coincides with the end of a half cycle and fails to trigger the switch which therefore remains non-conducting during the subsequent half-cycle. Similarly, when the D.C. signal is at a second level, the trigger pulse triggers the switch into conduction for a full half-cycle at which point another trigger pulse occurs, assuming no change in the D.C. signal level has taken place in the interim. Accordingly the current through the projector lamp is controlled and varied according to the state of the D.C. signal between the first and second levels.

Where two projector operation is required, a further ramp generator is provided, the output of which is in synchronism with that of the first, but whereas one output is positive going, the other is negative going. Again, the further ramp generator output is compared with that of the integrator output, and a trigger pulse produced which controls a further semiconductor switch connected to the second projector lamp and the same A.C. power supply as the other. The result of inverting one of the ramp generator outputs is to produce two sets of trigger pulses such that; each pulse of one set of pulses occurs at approximately 0° and each pulse of the other set occurs at approximately 180° (both relative to a cycle of the mains supply), when a first D.C. level is present; each pulse of both sets of pulses occurs at approximately 90° of a mains cycle when the D.C. level is mid-way between the first and second levels; the pulses to the two sets of pulses occur at 180° and 0° respectively, in the opposite sense to those corresponding to the first D.C. level, when the second D.C. level is present.

Again in the preferred form of the invention, the level ot threshold detector comprises a comparator which compares the integrator output with a fixed and predetermined voltage so that, when a limit voltage occurs, it generates a pulse which, via a driver amplifier, causes the slide magazine mechanism of the associated projector to change a slide.

Apparatus, whereby the method of the invention may be performed, is exemplified hereafter with reference to the accompanying drawings in which:

FIG. 1 shows schematically the circuit of apparatus for controlling two automatic slide changing projectors; and FIGS. 2A – 2L illustrate the voltages and waveforms developed at various points in the circuit of FIG. 1, FIGS. 2D – 2L inclusive are all drawn with a common horizontal time scale so that the relationship between the waveforms illustrataed in these Figures becomes immediately apparent.

Referring now to FIG. 1, the controller illustrated comprises a control box 20 in which is a potentiometer VR1 connected to a constant voltage source by means of series resistors R1, R2 and diodes D1 and D2. Also incorporated in box 20 are two biased switches, SW1 and SW2, each associated with respective limit positions X and Y of VR1 so that, when the slider of VR1 reaches position X, SW1 is operated to transfer the output connection of box 20 from the slider to the side of diode D1 connected to R1. Similarly switch SW2 is operated when the potentiometer slider reaches limit position Y and transfers the output connection of box 20 to the R2 side of diode D2. The output voltage produced at point A when the slider is moved from position Y to X, is shown in FIG. 2A. The effect of switches SW1 and SW2 is to produce fixed voltage levels corresponding to the above mentioned limit voltages at either end of the continuously variable level. These voltage steps provide the information for slide changing whilst the continuously variable voltage provides the information for projector lamp control.

The output of box 20 connects with a variable frequency oscillator 1 which is controlled thereby to produce an output having frequency related to its input voltage. FIG. 2B illustrates the waveform at point B of the circuit.

The oscillator 1 output connects, via switch SW3, with a tape recorder socket SK1 and a Schmitt trigger 2 followed immediately by an integrator 3. The Schmitt trigger 2 converts the oscillator output to a rectangular waveform (see FIG. 2C) and the integrator 3 integrates this to produce a D.C. signal which corresponds with that of the control box 20.

The D.C. signal from integrator 3 is fed to four threshold detector, trigger signal generators comprising comparator type Schmitt triggers, 4, 5, 6 and 7 respectively, which, in the case of triggers 4 and 5, compare the signal with ramp functions in order to determine the energy to be supplied to the respective lamps of projectors P and Q (not shown) and, in the case of triggers 6 and 7, compare the signal with predetermined D.C. voltages thereby to detect the slide-change controlling step voltages.

Ramp generators 16 and 17 are synchronized by the output of a full-wave rectifier 14 supplied with a reference A.C. supply at mains frequency, generator 16 providing a positive going output (see FIG. 2F) of twice mains frequency. Similarly generator 17 provides a saw-tooth output at twice mains frequency, but negative going. Both generators 16 and 17 being triggered by the pulsed output of Schmitt trigger 15, itself fired by the output of rectifier 14. FIGS. 2D and 2E show the waveforms at points D and E of the circuit.

FIGS. 2F and 2G show the respective ramp functions with the integrator 3 output superimposed thereon, whilst FIGS. 2H and 2J show the outputs of 4 and 5 resulting from the comparisons of ramp function and integrator output.

Comparator/trigger 4 output is fed through a driver 8 and transformer TR1 to the trigger electrode of a triac 18 which in turn controls the lamp current of projector P. Similarly, the output of comparator/trigger 5 is fed through a driver 9 and transformer TR2 to the trigger electrode of a triac 19 which controls the lamp current of projector Q.

The arrows 'T' in FIGS. 2H and 2J indicate the edge of the pulses from 4 and 5 which fire the corrresponding triacs 18 and 19, FIGS. 2F and 2L showing the output waveform of the triacs.

Inspection of FIGS. 2H to 2L inclusive will reveal that, as the integrator voltage rises, so triac 18 will fire later in each half cycle whilst triac 19 will fire earlier, the lamp of projector P receiving diminishing energy and that of projector Q receiving increasing energy. Conversely, as the integrator voltage falls, the lamp of projector P will receive increasing energy whilst that of projector Q will receive diminishing energy.

It is arranged that the two step voltages at each end of the continuously variable D.C. voltage do not affect the lamp currents, the voltages picked-off by the slider of VR1 as it approaches positions X and Y (but before operating switches SW1 and SW2) being sufficient to saturate one or the other of triacs 18 and 19.

Comparator/triggers 6 and 7 compare the integrator 3 output each with a voltage determined by voltage dividing resistor chain R3, R4 and R5 so that, when the integrator 3 output is the upper step voltage, trigger 6 produces a pulse which is prolonged by pulse-extender 10, amplified by amplifier 12 to thereby operate relay RL1 which causes the slide-change mechanism of projector P to operate (i.e. when the lamp of that projector is OFF). Likewise, when the integrator output assumes the lower step voltage, the slide of projector Q is caused to change, trigger 7 producing a pulse which is extended by pulse-extender 11, amplified by amplifier 13 to operate slide change controlling relay RL2.

Repeated movement of the slider of VR1 between positions X and Y will therefore, produce sequential dissolving and changing of slides. In order to pre-record a programme, a tape recorder (not shown) is plugged into socket SK1 and VR1 operated according to a desired sequence. Switch SW3 is switched to the "Tape" position when the apparatus is to be tape controlled, thus isolating control box 20 and oscillator 1, and the tape played-back into SK1.

What we claim is:

1. A projector control circuit for controlling the illumination of the lamp of the projector, comprising a triggered switch for controlling the supply of an alternating current to the lamp so that the amount of current supplied to the lamp can be varied from zero to the maximum the lamp can draw by varying the a.c. supply phase angle at which the triggered switch is fired, a generator for generating triggering signals for triggering the triggered switch in response to a ramp input signal exceeding the level of a threshold voltage applied to the generator, a ramp generator for producing ramp signals to operate the trigger signal generator, and a frequency signal decoder for producing a frequency dependent, integrated voltage to serve as a threshold voltage for the trigger-signal generator so that, with the triggered switch connected to the projector lamp, by continuously varying the frequency input to the decoder and thereby the threshold voltage applied to the trigger signal generator, the illumination of the lamp can be varied between zero and maximum brightness.

2. A circuit according to claim 1, for use with twin projectors, the circuit being duplicated insofar as to provide a trigger signal generator, a ramp signal generator and a triggered switch for each projector, with the ramp signal generators arranged to provide signals of opposite polarity so that, with the triggered switches connected respectively to the lamps of the projectors, as said frequency is varied first in one direction, the lamp of one projector is dimmed and then extinguished and the lamp of the other projector is illuminated and then brought up to full illumination and, as said frequency is then varied in the opposite direction to reverse the variation in the first direction, the lamp of the one projector is illuminated and then brought up to full illumination and the lamp of the other/projector is dimmed and then extinguished.

3. A circuit according to claim 2 wherein the frequency of operation of each ramp generator is twice that of the a.c. supply to the lamps.

4. A circuit according to claim 3, wherein each triggered switch comprises a parallel but oppositely poled arrangement of two unidirectional conducting devices operated by a common trigger signal so that, when a lamp is rendered conducting, it conducts in each half cycle of the a.c. supply.

5. A circuit according to claim 2, wherein each triggered switch comprises a silicon controlled rectifier.

6. A circuit according to claim 4, wherein each triggered switch is constituted by a single-trigger triac.

7. A circuit according to claim 2, wherein each triggered switch is fed from the respective trigger pulse generator through a transformer coupling.

8. A circuit according to claim 2, wherein each trigger pulse generator comprises a trigger circuit receiving the decoder output as an input, and a driver stage receiving the output of the trigger circuit and producing a trigger pulse in response thereto.

9. A circuit according to claim 8, wherein said trigger circuit comprises a Schmitt trigger.

10. A circuit according to claim 2, wherein each ramp generator generates a saw-tooth signal having a substantially instant fall time.

11. A circuit according to claim 10, wherein each saw-tooth generator is, driven by a squaring circuit from a full rectifier.

12. A circuit according to claim 11, wherein the squaring circuit is a Schmitt trigger.

13. A circuit according to claim 11, wherein the rectifier is a full wave bridge rectifier.

14. A circuit according to claim 1, for use with a projector having a slide magazine by electrical operation of which a plurality of slides in succession can be brought to a position for projection, wherein the decoder is adapted to respond to a change in said frequency greater than is needed to extinguish a projector lamp to produce, following such change, a limit voltage; and actuating means are provided by which, in response to the limit voltage, the magazine of the projector the lamp of which has been extinguished by said frequency change, can be actuated to cause a fresh slide to be moved to the viewing position.

15. A circuit according to claim 2, wherein a magazine actuating means is provided for each projector, and the decoder is adapted to respond to a change in said frequency in said one direction greater than is needed fully to extinguish the lamp of said one projector and fully to illuminate the lamp of said other projector, to produce a first limit voltage, and to respond to the reverse change in said frequency greater than is needed fully to illuminate the lamp of said one projector and fully to extinguish the lamp of said other projector, to produce a second limit voltage; and the two magazine actuating means are arranged so that the one provided in respect of said one projector responds only to the first limit voltage and so that the one provided in respect of said other projector responds only to the second limit voltage.

16. A circuit according to claim 15, wherein each magazine actuating means comprises a relay to control the supply of current to the projector magazine, and a trigger circuit responsive to the respective limit voltage to produce a pulse for actuation of the relay.

17. A circuit according to claim 16, wherein said trigger circuit of each magazine actuating means comprises a Schmitt trigger.

18. A circuit according to claim 16, wherein each magazine actuating means comprises a pulse extender for extending the pulse of the trigger circuit, and an amplifier for amplifying the extended pulse.

19. A circuit according to claim 2, wherein and adjustable control is provided to sweep the frequency range over which the decoder operates automatically on actuation thereof and at a rate determined by the setting of the control; the control comprising means for manual actuation thereof.

20. A circuit according to claim 19, wherein the actuating means comprises a manually operated switch.

21. A circuit according to claim 19, wherein a plurality of the adjustable controls are provided each to cover a range of rates of frequency sweep.

22. A circuit according to claim 15, wherein a magazine reset control is provided to permit the magazine of the or each projector used with the circuit, to be returned automatically to the beginning of a programme of slides held in the magazine, on actuation of the control; the reset control comprising means for manual actuation thereof.

23. A circuit according to claim 15, wherein a directional control is provided to permit the magazine of each projector to be reversed in direction in response to each limit voltage or to be made unresponsive thereto so that the lamp of each projector can be operated without causing operation of the magazine of each projector; the direction control comprising means for manual actuation thereof.

24. A circuit according to claim 23, wherein the means for manual actuation is a manually operated switch.

25. A circuit according to claim 12, wherein the circuit provides an input for connection of an alternative manual actuation means for each control, carried on a handset to permit remote operation of the controls.

26. A circuit according to claim 19, wherein the circuit provides an input for receiving recorded actuating signals for control.

27. A circuit according to claim 25, comprising an encoder to permit recording of the actuating signals produced by manual actuation in use of the circuit in projector control.

28. A circuit according to claim 2, comprising a manually operated encoder for providing the frequency input to the decoder, the encoder comprising a frequency generator the frequency of the output of which varies with the input voltage applied thereto, and a potentiometer the slider of which is manually operable continuously to vary said input voltage.

29. A circuit according to claim 28, wherein the potentiometer comprises limit switches for operation respectively in the extreme positions of the potentiometer slider to apply input voltages to the frequency generator such as to cause the decoder to produce first and second limit voltages respectively.

30. A circuit according to claim 28, wherein the potentiometer is in the form of a handset.

31. A circuit according to claim 30 wherein the handset and the frequency generator are connected so that the handset can be manually disconnected and re-connected to the generator.

32. A circuit according to claim 2 wherein the decoder provides an input to receive recorded frequency signals.

33. A circuit according to claim 2, wherein the encoder provides an output for connection to a recorder so that the signals provided by the encoder can be recorded.

34. Apparatus comprising a circuit according to claim 2, and a projector adapted for use with the circuit.

35. Apparatus according to claim 34, wherein a set of projectors, arranged in parallel, is used with the circuit.

36. Apparatus according to claim 34, wherein twin projectors are used with the circuit.

37. Apparatus according to claim 36, wherein twin sets of projectors are used; the projectors in each set being connected in parallel.

* * * * *